United States Patent [19]

Kita et al.

[11] 4,219,933
[45] Sep. 2, 1980

[54] DIFFRACTION GRATING RULING ENGINE

[75] Inventors: Toshiaki Kita, Hinodemachi; Shigeo Moriyama, Kokubunji; Tatsuo Harada, Fuchu, all of Japan

[73] Assignee: Hitachi, Ltd., Japan

[21] Appl. No.: 56,257

[22] Filed: Jul. 10, 1979

[30] Foreign Application Priority Data

Jul. 10, 1978 [JP] Japan .................................. 53/83012

[51] Int. Cl.² ............................................. B43L 13/24
[52] U.S. Cl. ................................... 33/19 A; 33/24 R; 33/27 K; 33/21 R
[58] Field of Search ................... 33/19 R, 19 A, 19 B, 33/18 R, 23 R, 23 H, 23 K, 21 R, 21 B, 21 D, 22, 24 R, 24 B, 24 C, 27 H, 27 K, 32 R, 32 C

[56] References Cited

U.S. PATENT DOCUMENTS

| | | | |
|---|---|---|---|
| 1,956,505 | 4/1934 | Horner | 33/23 K |
| 2,303,299 | 11/1942 | Finn | 33/19 A |
| 3,344,526 | 10/1967 | Horsfield | 33/19 A |
| 4,012,843 | 3/1977 | Harada et al. | 33/19 A |

Primary Examiner—Harry N. Haroian
Attorney, Agent, or Firm—Craig & Antonelli

[57] ABSTRACT

A device for the fabrication of a concave diffraction grating wherein grating grooves are mechanically ruled on a spherical surface of a diffraction grating blank and wherein a tool for ruling the grating grooves is reciprocated along the spherical surface of the diffraction grating blank, guided by a cylindrical cam, to form grooves having a uniform sectional shape over their whole area, whereby a concave diffraction grating of high diffraction efficiency and little scattering light is fabricated.

4 Claims, 5 Drawing Figures

DIFFRACTION GRATING RULING ENGINE

BACKGROUND OF THE INVENTION

This invention relates to a diffraction grating engraving machine (ruling engine) which fabricates a diffraction grating for use in a spectroscopic instrument, especially a concave diffraction grating.

Heretofore, a concave diffraction grating has been mechanically ruled with grating grooves on a spherical surface by means of a diffraction grating ruling engine as shown in FIG. 1 which comprises a tool holder and a tool slide. In the prior art, wherein the reciprocation of the tool slide 7 (in the direction indicated by arrows) is executed on a rectilinear guide 8 through sliders 6, with the rectilinear motion of the tool slide 7 a great displacement occurs between the tool holder 3 and a blank 1, a tool 2 rotates about a cross spring 4, and grooves are ruled with different positions of the bilge-shaped tip of the tool in the lengthwise direction of the grooves. The shape of the tool tip is not usually perfect, and often includes imperfections. In the figure, numeral 5 designates a supporting frame which is fixed to the tool slide 7 and which supports the tool holder 3, etc.

According to the prior art method, the ruling technique for a plane diffraction grating is applied to the grating groove-ruling technique for the concave diffraction grating as it is. Therefore, the sectional shape of the groove does not become uniform. Particularly, the sectional groove shape ruled by the broken part is not a saw-tooth shape which has a uniform sectional form aimed at. Since the surface of the blank 1 is spherical (in this example, concave) as shown in FIG. 2, the above fact takes place, not only in the lengthwise direction of the grooves (Y-direction), but also in the widthwise direction thereof (X-direction).

The concave diffraction grating has both function of dispersing light as the diffraction grating and the focusing characteristic of a concave mirror. It is convenient in that it does not need collimating and focusing optical systems composed of either lenses or concave mirrors as required in a plane grating spectroscopic instrument. With the prior art, however, the fabrication of grating grooves having a sectional shape uniform over the entire area has been impossible as stated above. Therefore, it has ordinarily been possible to realize only the fabrication of a concave diffraction grating whose diffraction efficiency is low and whose light scattering is especially great.

SUMMARY OF THE INVENTION

The present invention has been made in view of the above facts and has for an object to provide a concave diffraction grating of high diffraction efficiency and low light scattering by making possible the fabrication of grating grooves which have a uniform sectional shape over the entire area.

In the fabrication of a concave diffraction grating wherein grating grooves are mechanically ruled on a spherical surface by a diffraction grating ruling engine, in order to form the grooves which have a uniform sectional shape over the whole area, a tool for ruling the grating grooves needs to be reciprocated along the spherical surface of a diffraction grating blank.

This invention intends to accomplish the aforecited object in such a way that the function for reciprocating the tool along the spherical surface of the grating blank is split into one for the lengthwise direction of the grooves and one for the widthwise direction of the grooves, and that as regards the former, the reciprocation of a tool slide which holds the tool is effected on a cylindrical cam, while as regards the latter, the cylindrical cam is endowed with a vertical motion in correspondence with the grating groove position instead of having its radius of curvature varied, whereby the tool proceeds approximately along the spherical surface of the grating blank.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENTS

Figure 1:
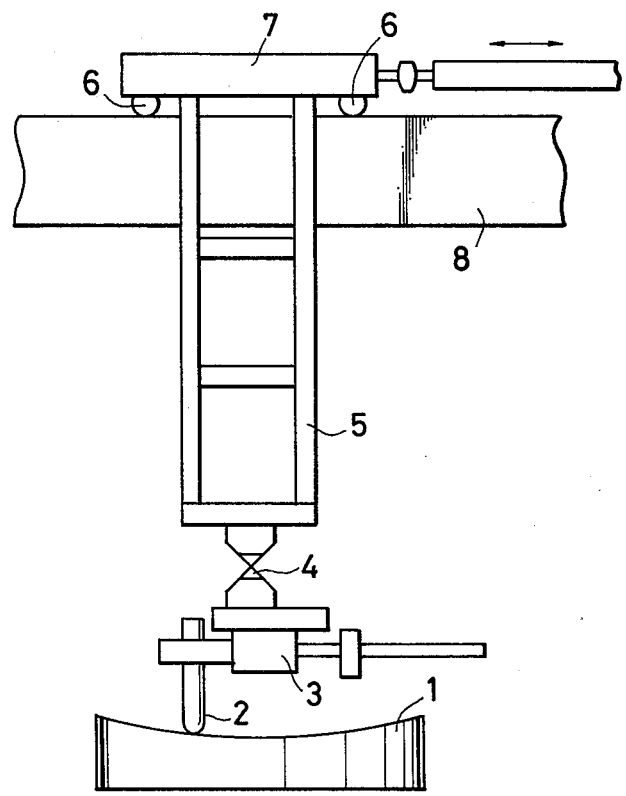
FIG. 1 is a view showing a part of a prior art diffraction grating rule engine.
Figure 2:
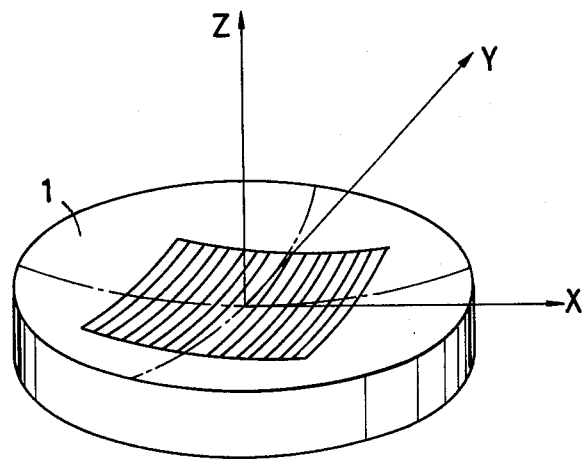
FIG. 2 is a view showing an example of a concave diffraction grating.
Figure 3:
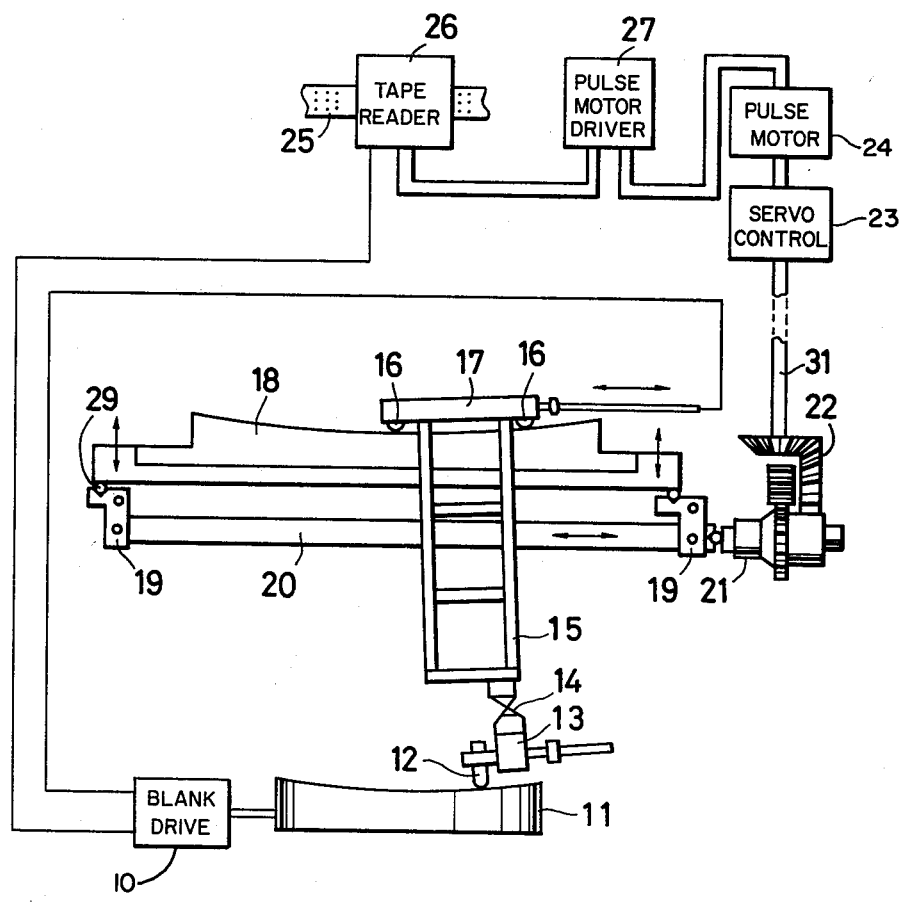
FIG. 3 is a view showing an embodiment of a diffraction grating ruling engine according to the present invention.

FIG. 3 is a view for explaining a preferred embodiment of a method of fabricating a concave diffraction grating in this invention. According to the present embodiment, the reciprocation of a tool for ruling grating grooves is executed with a cylindrical cam as a guide, and the vertical motion of the cylindrical cam is executed by a numerical control employing a control tape.

A diffraction grating blank 11 and a cylindrical cam 18 formed with a part of cylindrical surface whose radius of curvature is smaller than that of the part spherical surface of the grating blank by a fixed amount (a length from a tool slide 17 to the front end of a tool 12, and 180 mm in this example) are arranged so that the circular arc of the cylindrical cam 18 and the circular arc of a grating blank section parallel to the grating grooves may form parts of two concentric circles. When, under this condition, the tool slide 17 reciprocates on the cylindrical cam 18 through sliders 16, the front end of the tool executes the same locus as a pendulum whose arm has a length equal to the radius of curvature of the diffraction grating blank 11. That is, the tool 12 reciprocates along the circular arc of the grating blank section, to rule the grating grooves which have an identical sectional shape in the lengthwise direction of the grooves.

On the other hand, the vertical motion of the cylindrical cam 18 along the circular arc of the grating blank section in the widthwise direction of the grooves is carried out by the numerical control which resorts to the control tape and a pulse motor. In the control tape 25, there are recorded the numbers of grooves at the generation of pulses for rotating the pulse motor 24 as evaluated from the relationship between the grating groove position and the circular arc at the time when the circular arc is approximated into steps the interval of which is an ascent or descent (2 μm in this example) corresponding to the unit rotational angle of the pulse motor 24.

The content of the control tape is read out by a tape reader 26, and a pulse motor driver 27 rotates the pulse motor 24 one step each time the pulse is generated. The rotational angle is converted by a micrometer head 21 into a rectilinear quantity, which is further contracted and transmitted by a lever 19, with the result that the cylindrical cam 18 is driven up and down approximately along the circular arc of the diffraction grating blank with the unit being, for example, 2 μm.

Both the reciprocating motion in the lengthwise direction of the grating grooves and the vertical motion in the widthwise direction thereof as above described are effected in response to feed means, schematically shown at 10, for giving the grating blank 11 a predetermined feed in the widthwise direction of the grating grooves.

In FIG. 3, numeral 13 designates a tool holder, numeral 14 a cross spring flexibly holding a tool holder 13 upon a supporting frame 15. Numeral 20 indicates a coupling rod, numeral 22 a gear train, numeral 23 a servo follow-up control, and numeral 31 a rod.

Figure 4:
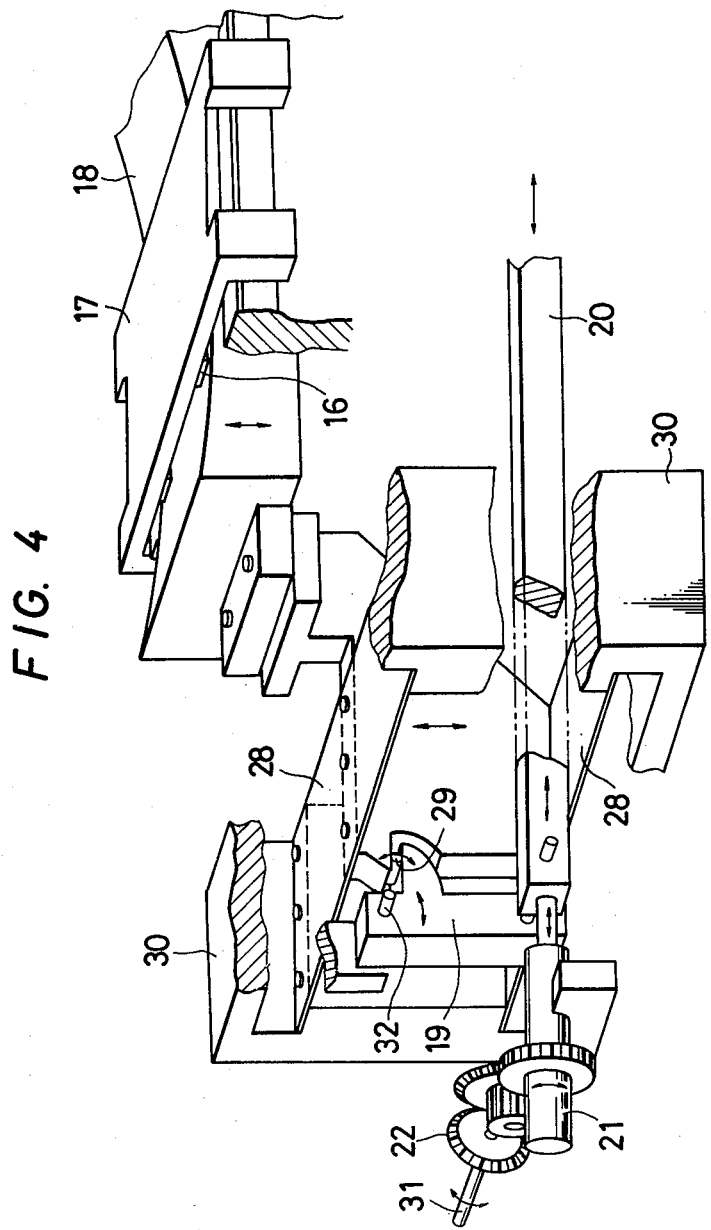
FIG. 4 is a view showing an example of a cylindrical cam-vertical motion mechanism in accordance with the invention.

Shown in FIG. 4 is an example of a cylindrical cam-vertical motion mechanism for moving the tool up and down along the circular arc of the grating blank section in the widthwise direction of the grooves.

Referring to FIG. 4, the cylindrical cam 18 is supported by two sets of parallel springs 28 which are composed of four phosphor bronze plates. The plates exhibit sufficiently high rigidities frontwards and rearwards, rightwards and leftwards, and against inclinations, and they are capable of parallel movement (about 2 mm in this example) only in the vertical direction.

The rotation of the driving source for the vertical motion of the cylindrical cam is transmitted through the rod 31 to the gear train 22 of the body of the apparatus. The rotation of the gear train is converted into rectilinear motion by the micrometer head 21. Owing to the levers 19 (with fulcra 32) which are integrally moved by the coupling rod 20 and which are located on both the right and left sides, pins 29 being interposed between the levers and the cylindrical cam, the displacement is contracted to e.g. 1/4.5 and becomes the vertical motion of the cylindrical cam 18. In FIG. 4, numeral 30 indicates a frame.

The rotation of the driving source for the vertical motion of the cylindrical cam is established by the pulse motor 24 which is rotated by a signal from the tape reader 26 in the embodiment of FIG. 3. In order to prevent oscillations during the rotation of the pulse motor 24 from being transmitted to the body of the apparatus, the rotation is transmitted to the apparatus proper through the servo follow-up control 23 whose response rate is very low in such a manner that the time constant is, for example, about 5 seconds.

In the illustrated embodiment, one step of the rotation of the pulse motor corresponds to the vertical movement of 2 μm of the cylindrical cam. The circular arc of the blank of the concave diffraction grating to be fabricated is approximated into the stairs of the unit steps of 2 μm of the cylindrical cam. The circular arc of the blank of the concave diffraction grating to be fabricated is approximated into the staris of the unit steps of 2 μm, and groove Nos. to vary the stairs are recorded in the paper tape for the numerical control 25. Upon instructions from the tape reader 26, the pulse motor driver 27 rotates the pulse motor 24 step by step and moves the cylindrical cam 18 up and down.

The radius of curvature of the circular arc of the grating blank section in the lengthwise direction of the grooves as above described becomes smaller with the distance from the central part of the diffraction grating blank. Strictly speaking, therefore, the circular arc of the cylindrical cam and that of the grating blank section do not become concentric circles except the central part by the use of the vertical motion of the cylindrical cam. Since, however, ordinarily the ruling width of the diffraction grating is sufficiently small as compared with the radius of curvature of the spherical surface, the variations of the radius of curvature of the circular arc are almost negligible and pose no problem in practical use.

The shape of the surface of the grating blank varies depending upon the radius of curvature of the concave diffraction grating to be fabricated. However, the fabrication of a concave diffraction grating having any desired radius of curvature is possible by employing a cylindrical cam and a control tape which have been prepared in correspondence with this radius of curvature.

Also an aspherical surface such as toroidal surface whose radius of curvature differs between the lengthwise direction of the grooves and in the widthwise direction thereof can be ruled under quite the same conditions as in the case of the spherical surface by the combinations of cylindrical cams and control tapes conforming with the respective radii of curvatures.

Further, regarding the diffraction gratings, ones fabricated with the diffraction grating ruling engine were directly employed for spectroscopic uses at the initial stage. In recent years, however, mass production based on the transfer reproduction has become possible owing to the enhancement of the replica technology. The same applies to the case of the concave diffraction grating, and products for use in the general spectroscopic instruments are replica diffraction gratings which have undergone transfer reproduction processes over several generations from a master diffraction grating ruled with the ruling engine. Therefore, the master diffraction grating need not always be of a concave surface, but it may well be one in which grooves are ruled on a convex surface.

Figure 5:
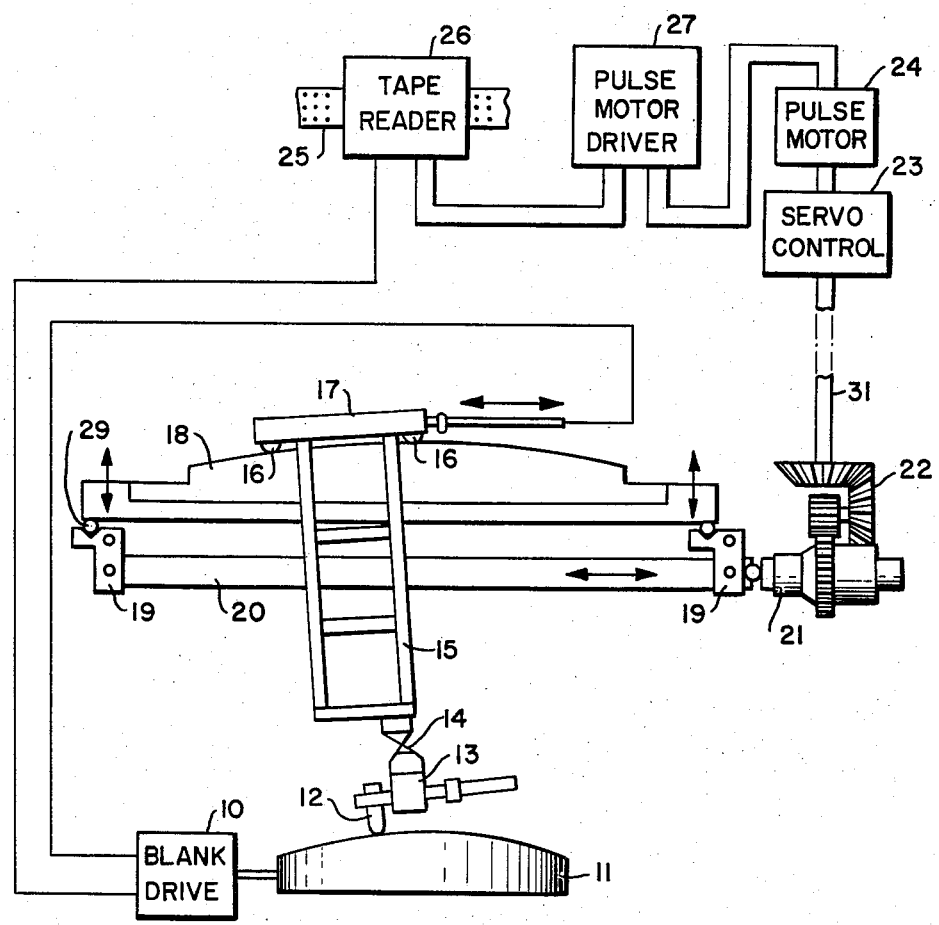
FIG. 5 is a view showing a convex diffraction grating.

According to this invention, by employing a convex cylindrical cam, grating grooves can be ruled on a convex surface quite similarly to the case of the concave surface. In the case of the convex surface, a cylindrical cam whose radius of curvature is larger than that of a diffraction grating blank by a fixed amount (for example, 180 mm after the foregoing embodiment) conversely to the case where a concave surface is employed, and this is advantageous in the case where the radius of curvature is small. With a system wherein a convex grating blank is ruled by the use of a convex cylindrical cam, it is possible to fabricate a concave diffraction grating which has as small a radius of curvature as about 50 mm. As can be seen from FIG. 5 (wherein equivalent parts bear the same numerals as in FIG. 3), aside from the contour of cam 18, no changes are required in the apparatus for producing convex, as opposed to concave, diffraction gratings.

Needless to say, this invention is not restricted to the concrete numerical values used in the above explanation of the embodiments, but it can select appropriate values in dependence on desired setting conditions, etc.

As described above, this invention has the effect that even when it is applied to a diffraction grating ruling engine for fabricating a conventional concave diffraction grating in which equally-spaced, parallel rectilinear grooves are ruled on the chord of a spherical blank, a concave diffraction grating which has a diffraction efficiency and a scattering light intensity close to those of a plane diffraction grating can be manufactured. It has an especially great effect when applied to a ruling engine performing a method of the type disclosed in U.S. Pat. No. 4,012,843.

More specifically, with a spectroscope including the conventional concave diffraction grating which is ruled with the equally-spaced parallel rectilinear grooves, it has been inevitable that a spectrum obtained is usually attended with many aberrations, particularly astigmatism. In this manner, the conventional concave diffraction grating has had this essential defect in addition to the disadvantages which this invention raises as problems to be solved thereby. The invention of the above-noted patent provides a method of fabricating a concave diffraction grating which eliminates or reduces the aberrations. By applying the present invention to such a ruling engine, it becomes possible to fabricate a concave diffraction grating which simultaneously eliminates or reduces both the essential disadvantage with respect to the aberrations and the disadvantage ascribable to the fabricating technology that produces a sectional shape of the grooves which is imperfect attendant to conventional concave diffraction gratings.

Heretofore, the concave diffraction grating has had its use limited chiefly to a spectrophotometer in the vacuum ultraviolet region whose reflection factor on a metallic surface is low and which is not transmitted through glass, in other words, for which no lens can be used and with regard to which it is desired to lessen the number of times of reflections on a metallic surface to the utmost. However, by eliminating or reducing the disadvantages of the prior art as stated above, the use of concave diffraction gratings is also opened to spectroscopic instruments in the ultraviolet and visible regions, and it is possible to develop spectroscopic instruments which fully exploit the merit of eliminating the need for a lens or concave mirror, as is the inherent nature of the concave diffraction grating.

As set forth above, according to the present invention, the fabrication of grating grooves which have a sectional shape that is uniform over the whole grating groove area is enabled, and a concave diffraction grating of high diffraction efficiency and low light scattering can be provided. As stated above, the effect of the invention is remarkable in practical use.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. In a diffraction grating ruling engine for mechanically ruling grating grooves on a spherical surface of a diffraction grating blank, the combination comprising: tool means for ruling grating grooves on the spherical surface of the diffraction grating blank, slide means for flexibly holding said tool means, cam means having a cylindrical arc surface with a circular arc part which defines a portion of a concentric circle with respect to a circular arc part of a grating blank section parallel to said grating grooves, feed means for feeding said diffraction grating blank a predetermined amount in a widthwise direction of said grating grooves, means for reciprocating said slide means in a lengthwise direction of said grating grooves in response to said feed means and with said cylindrical cam means as a guide, and displacement means for vertically moving said cylindrical cam means a distance which is a function of a radius of curvature of said diffraction grating blank and in correspondence with a grating groove position in the widthwise direction of said grating grooves as given by said feed means.

2. A diffraction grating ruling engine as defined in claim 1, wherein said displacement means comprises a numerical control employing a control tape.

3. A diffraction grating ruling engine as defined in claim 2, wherein said cylindrical arc surface has a radius of curvature which is smaller by a fixed amount than said radius of curvature of said spherical surface of said diffraction grating blank and which defines a part of said concentric circle with respect to said circular arc part of said grating blank section parallel to said grating grooves.

4. A diffraction grating ruling engine as defined in claim 2, wherein said cylindrical arc surface has a radius of curvature which is greater by a fixed amount than said radius of curvature of said spherical surface of said diffraction grating blank and which defines a psrt of said concentric circle with respect to said circular arc part of said grating blank section parallel to said grating grooves.

* * * * *